Figure 1:
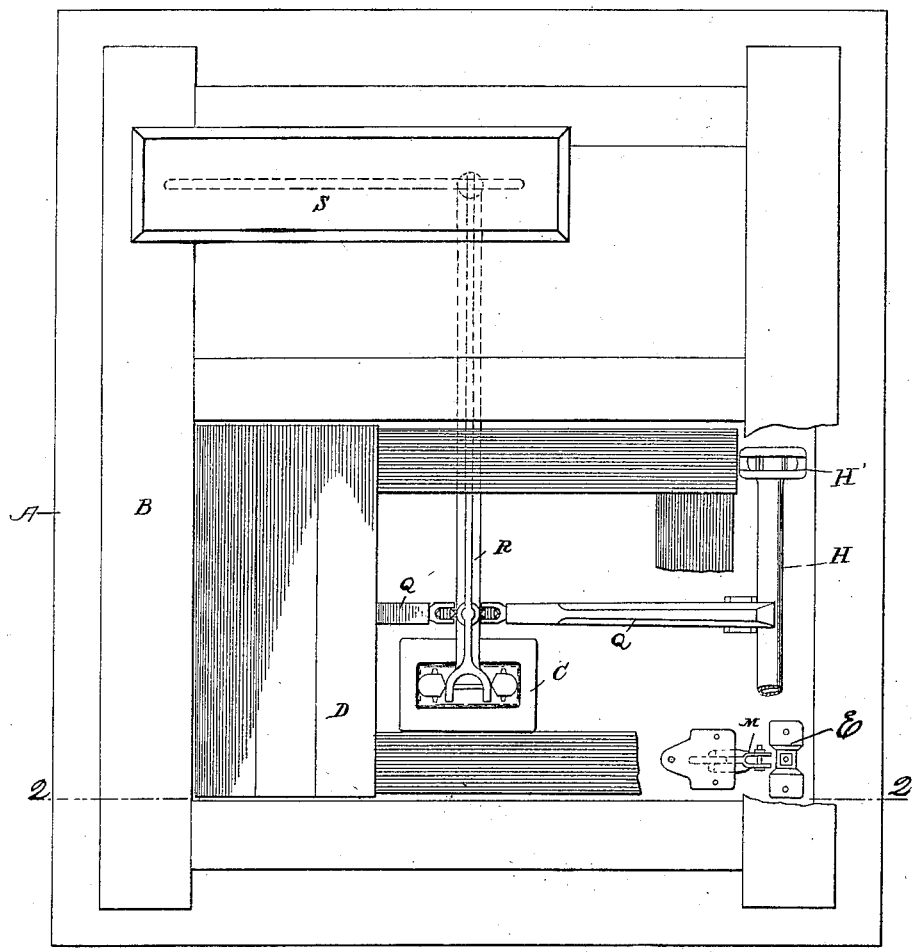

(No Model.) 3 Sheets—Sheet 1.

S. T. BRALEY.
PLATFORM SCALE.

No. 552,272. Patented Dec. 31, 1895.

Attest.
Milton O'Connell
Edw. D. Duvall Jr.

Inventor
Samuel T. Braley
by C. S. Watton
Atty.

ANDREW B. GRAHAM, PHOTO-LITHO, WASHINGTON, D.C.

(No Model.) 3 Sheets—Sheet 2.
S. T. BRALEY.
PLATFORM SCALE.
No. 552,272. Patented Dec. 31, 1895.
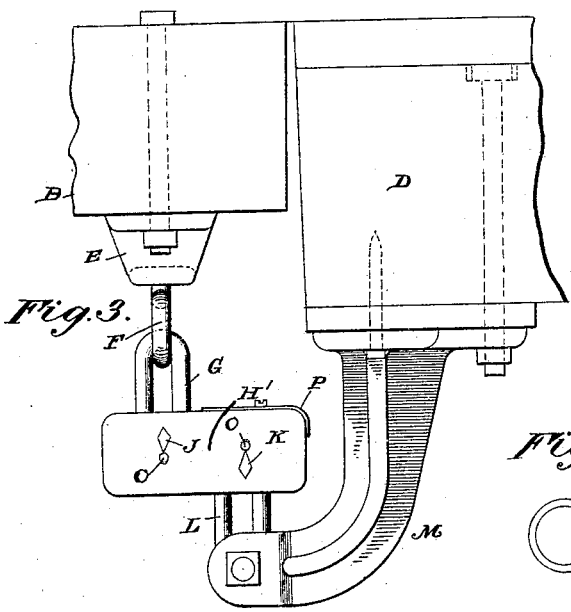
Fig. 3.
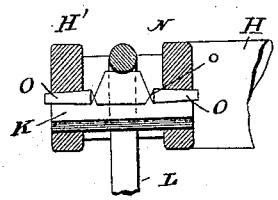
Fig. 13.
Fig. 7¹.  Fig. 7.
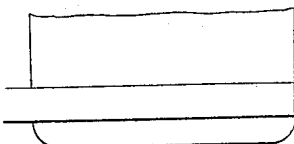
Fig. 6.
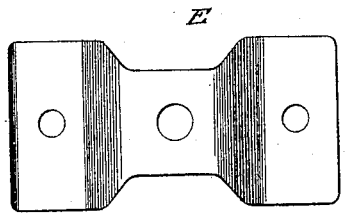
Fig. 4¹.
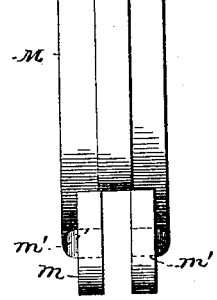
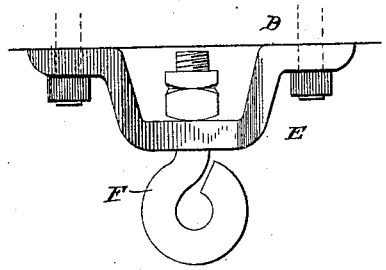
Fig. 4.
Attest.
Milton O'Connell
Edw. E. Durall Jr.
Inventor:
Samuel T. Braley.
by C. S. Watton
Atty.

(No Model.) 3 Sheets—Sheet 3.

S. T. BRALEY.
PLATFORM SCALE.

No. 552,272. Patented Dec. 31, 1895.

Attest.
Milton O'Connell
Edw. D. Duvall Jr.

Inventor.
Samuel T. Braley.
by C. S. Walton
Atty.

UNITED STATES PATENT OFFICE.

SAMUEL T. BRALEY, OF RUTLAND, VERMONT, ASSIGNOR TO THE HOWE SCALE COMPANY OF 1886, OF SAME PLACE.

PLATFORM-SCALE.

SPECIFICATION forming part of Letters Patent No. 552,272, dated December 31, 1895.

Application filed June 12, 1895. Serial No. 552,565. (No model.)

*To all whom it may concern:*

Be it known that I, SAMUEL T. BRALEY, a citizen of the United States, residing at Rutland, in the county of Rutland and State of Vermont, have invented certain new and useful Improvements in Platform-Scales, of which the following is a specification.

My invention relates to that class of weighing-machines known under the names of "miner," "depot," or "transportation" scales, used to determine the weight of small four-wheel cars loaded with coal, ore, castings or machinery, and for other purposes. The weighing capacity of the machines varies from two to a hundred tons.

In the construction of scales heretofore used the supports of the weighing-platform or some of them are usually placed a short distance from the ends of the platform, leaving a part thereof overhanging or projecting beyond said supports, so that when a four-wheel car with its load (often of several tons weight) is run onto the end of the platform the load is for a moment supported by the overhanging platform, which tends to tip up the opposite end, using the bearings of the supports at the nearest end as a fulcrum. If the load so placed is greater than the load of the platform itself, the opposite end of the platform tips up and the scale is disarranged and the knife-edges of the main rods and levers are subjected to a hammering action, when the car is run off the scale and on the return of the platform to its original position. The above-described action destroys the knife-edges and consequently the accuracy of the entire mechanism.

My invention further relates to improved means to limit the unnecessary play of the supports or bearing-blocks on the knife-edge bearings, as well as to prevent friction of these parts, evils which also tend to destroy the knife-edges and render the scale inaccurate.

For a full and clear understanding of my invention reference is to be had to the accompanying drawings, wherein corresponding letters indicate like parts in the several views, and in which—

Figure 2:
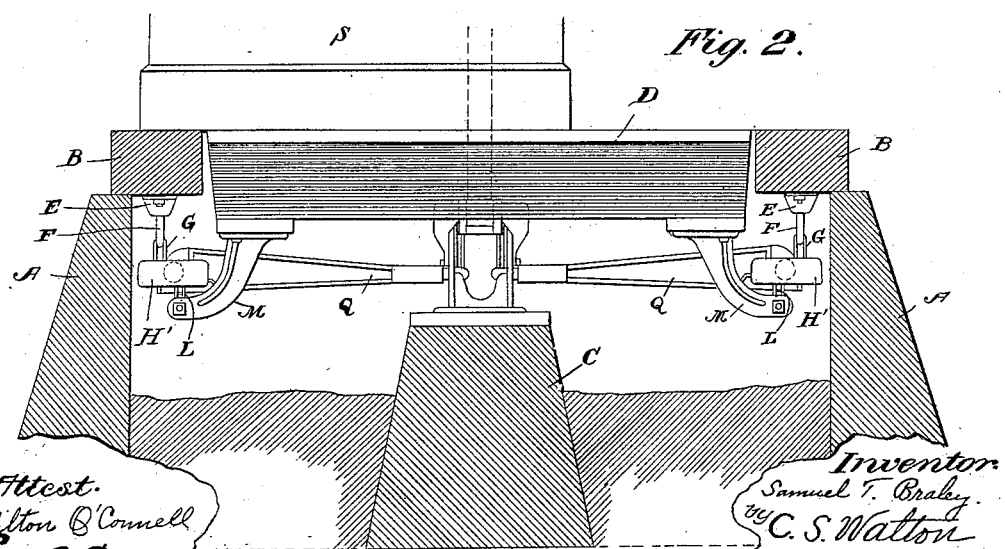
Figure 10:
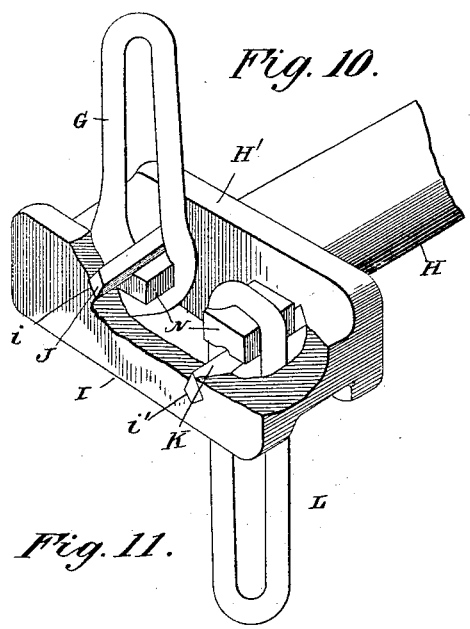
Figure 9:
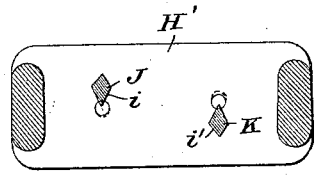
Figure 11:
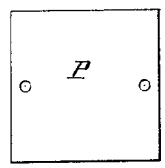
Figure 5:
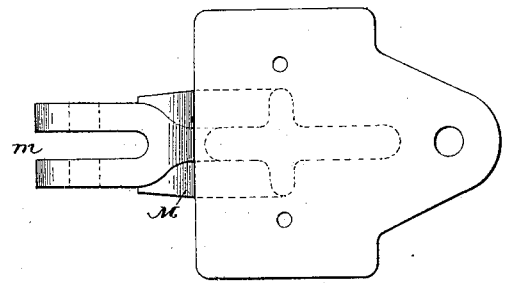
Figure 8:
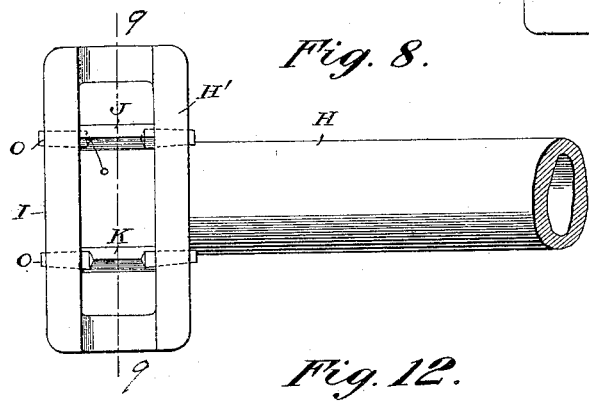
Figure 12:
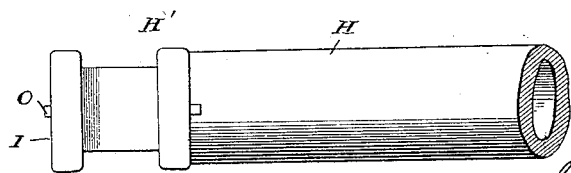

Figure 1 is a plan view of the scale and its supports, portions being broken away for clearer illustration. Fig. 2 is a longitudinal vertical section taken on line 2 2, Fig. 1. Fig. 3 represents enlarged details of the mechanism for supporting one corner of the weighing-platform from the framework of the scales. Figs. 4 and 4' are plan and side views respectively of suspending-brackets. Figs. 5 and 6 are plan and front end elevational views of a platform-bearing bracket. Figs. 7 and 7' are side and end views of a friction-plug. Fig. 8 is a plan view of one end of a main lever-rod with knife-edge bearings and friction-plugs mounted therein. Fig. 9 is an end sectional view of the same, taken on line 9 9 of Fig. 8. Fig. 10 is a perspective view of the enlarged end of a main lever-rod partly broken away to illustrate knife-edge bearings mounted therein, bearing-blocks, and suspension-links. Fig. 11 is a dirt-shield. Fig. 12 is a side view of one end of a main lever-rod, and Fig. 13 is a longitudinal sectional view of the enlarged end of a main lever-rod, showing a knife-edge bearing, a bearing-block, friction-plugs, and a suspending-link.

In the drawings, A represents the foundation-walls of the scale.

B is an open framework of heavy timbers resting on said walls, which on two sides partly overhangs the pit between the walls, as shown in Fig. 2.

C is a small low rectangular foundation between the walls A, upon which one end of a secondary lever, hereinafter referred to, is pivotally supported.

D refers to the weighing-platform of the scales, constructed of heavy timbers and planks in any well-known manner and suspended, as hereinafter described, within the framework B and over the pit between the foundation-walls.

E are suspending-brackets, preferably of the form shown in Figs. 4 and 4', which are bolted to the under side of the overhanging timbers B of the framework (see Fig. 2) near the corners of the pit. Eyebolts F are attached to the brackets E, and suspending-links G are suspended from said eyebolts, as shown.

H are main lever-rods having enlarged recessed ends H', preferably of rectangular form, as shown in Figs. 8, 10, and 12, said rods being preferably of cylindrical construction for lightness and strength. These rods are supported underneath the overhanging timbers B from the suspending-links G by means of knife-edge bearings J, suitably secured in the ends $i$, nearest the foundation-walls, of the recesses H'. (See Figs. 2 and 10.) In the opposite ends $i'$ of the recesses, farthest from the walls and slightly below the plane of the bearings J, is mounted a second set of knife-edge bearings K. (See Figs. 9 and 10.) From these latter bearings is suspended, by means of links L and outwardly-curved brackets M, the platform D. The brackets M are securely secured to the under side of platform D near the corners thereof, and their lower ends $m$ are curved outwardly and recessed with apertures $m'$, as shown, to permit these ends to be secured to the suspended link L by means of bolts and nuts.

It is to be noticed that the lower ends of the curved brackets M fall outside of the edges of platform D, under the framework B, so that all points of suspension of the platform are outside of perpendiculars let fall from the edges of said platform. (See Figs. 2 and 3.) This avoids the tilting effect of the platform when heavy loads are run on and off the scales, such as are encountered where some or all of the points of suspension fall under the platform, and the consequent disarrangement and destruction of the knife-bearing edges.

Bearing-blocks N of suitable form and material are fitted in the lower and upper ends respectively of links G and L. (See Fig. 10.) The length of these blocks is somewhat shorter than the width of the recesses H', and to limit the play of these bearing-blocks upon the knife-edges J and K, as well as to prevent the friction of the blocks against the side walls of the recesses H', apertures are made in said side walls directly below and above the knife-edges J and K, respectively, in which are suitably secured tapering friction-plugs O, having recesses $o'$ lengthwise of the same, which fit upon the knife-edges, (see Figs. 7 and 7',) the enlarged ends terminating in points $o$, which project a slight distance inwardly from the side walls and bear centrally upon the ends of the bearing-blocks when they are in position.

P are curved shields made of sheet metal and apertured to permit the same to be secured upon the ends $i'$ of the enlarged ends of the main lever-rods (see Fig. 3) to protect the bearings K from foreign material falling from above into the pit.

Q are main levers secured at their outer ends centrally to the main lever-rods H, and their inner ends are suspended from a secondary lever R, near its outer end, as shown in Fig. 1, the outer end of the secondary lever being pivotally mounted on the foundation C, and its inner end being connected, in any well-known manner, with scale-beams in the housing S. As these connections form no part of the present invention further description thereof is omitted.

Having thus described my invention, what I desire to secure by Letters Patent is—

1. The combination in a platform scale, of a foundation, a frame-work on the foundation partly overhanging the same on two sides, a weighing platform within the frame-work, outwardly curved brackets secured to the bottom of the platform, near the corners thereof, the lower ends of the brackets extending outside the edges of the platform and under the frame-work of the scales and being suspended from said frame-work by suspension brackets attached thereto, and by connecting eye-bolts, links, and main lever rods, said lever rods having enlarged recessed ends, bearings mounted in said ends, blocks in the links resting upon said bearings, means to adjust and to limit the side play of the bearing blocks and to prevent friction of the same against the side walls of said recesses, main levers and a secondary lever connecting the main lever rods with a weighing beam, the other end of the secondary lever being pivotally supported on a foundation underneath the platform, substantially as described and set forth.

2. The combination in a platform scale, of a frame-work, a weighing platform, outwardly curved suspension brackets secured to the under side of the platform and having lower recessed ends, suspension brackets attached to the under side of the frame-work, a main lever rod having enlarged recessed ends, knife edge bearings mounted in said ends, adjustable and removable friction plugs secured in the side walls of said recesses, bearing blocks secured in links and bearing upon said edges and limited from side play by said plugs, said links and eye-bolts connecting the suspension brackets with said curved brackets, main levers and a secondary lever connecting the main lever rods with a weighing beam, the inner end of the secondary lever being pivotally supported on a foundation underneath the scale, as and for the purposes set forth.

In testimony whereof I affix my signature in presence of two witnesses.

SAMUEL T. BRALEY.

Witnesses:
RUSH P. BARRETT,
CARL B. HINSMAN.